Oct. 8, 1968     F. L. BISHOP     3,404,769

CATHODE-RAY TUBE ENVELOPES

Filed Dec. 5, 1966

INVENTOR.
F. L. BISHOP
BY
ATTORNEYS

United States Patent Office 3,404,769
Patented Oct. 8, 1968

3,404,769
CATHODE-RAY TUBE ENVELOPES
Frederic Lendall Bishop, Toledo, Ohio, assignor to
Owens-Illinois, Inc., a corporation of Ohio
Filed Dec. 5, 1966, Ser. No. 599,256
8 Claims. (Cl. 220—2.3)

ABSTRACT OF THE DISCLOSURE

This application relates to an article of manufacture such as a cathode-ray tube envelope formed from a plurality of prefabricated parts, the face plate member being comprised of fused silica or glass-ceramic having a low coefficient of thermal expansion, the body member being comprised of a conventional electrical glass with an annular metal sealing ring at its larger end with several intermediate sealants between said sealing ring and the face plate periphery.

---

Figure 1:
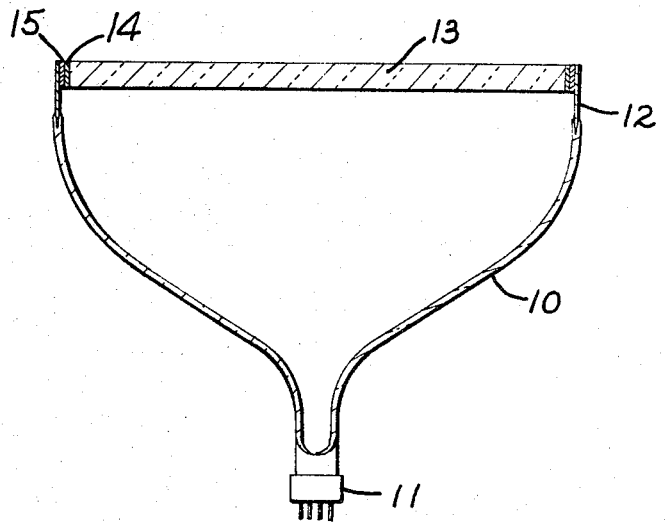

The present invention relates to an article of manufacture and more specifically to a hollow article assembled from a plurality of individual prefabricated parts to form a composite assembly such as a cathode-ray tube envelope or the like. The present invention relates to a novel cathode-ray tube envelope comprised of a hollow glass body member and a quartz or fused silica viewing member intimately joined to said body member in hermetic vacuum-tight relation to form a composite tube envelope. The envelopes. Fused silica which consists of a tightly-bonded fabrication from presently available materials to form a tube envelope having distinctive properties for its intended end use.

Heretofore, special power tubes utilizing fused silica parts or envelopes and so-called "quartz" lamps have both been made in increasing numbers in recent years for commercial and industrial lighting. Fused silica, due to its unusual properties, offers significant advantages for comprising the face plate member of special cathode-ray tube envelopes. Fused silica which consists of a tightly-bonded network has a low coefficient of thermal expansion, great heat-shock resistance, high transparency to ultraviolet light, and a low dielectric constant and electrical loss factor. Fused silica is considered an ideal material for electron tube envelopes; however, its chief disadvantage is its high softening point which makes it difficult to work on conventional sealing machines. Also, since there are essentially no metals which match its low coefficient of thermal expansion, its utilization in the manufacture of electron tubes has been limited.

Quartz is a natural mineral which undergoes several transformations under the influence of heat and turns into tridymite at 370° C., cristobalite at 1470° C. and vitreous silica at 1723° C., the melting point of $SiO_2$. Fused silica, which having once been made molten, exists at all temperatures below 1723° C. and thus is an unstable supercooled liquid. Fused silica is the proper term for all fabricated ware which has been worked at high temperatures; however, the name "quartz" continues in common usage for lamps, and the like, made of fused silica.

The sealing of component parts of electron tubes or envelopes having glass body portions and fused silica faceplate portions, for example, into vacuum-tight relation has remained a serious problem in the art. Electrical glasses such as for cathode-ray image tubes usually possess a thermal expansion coefficient of 90 to $92 \times 10^{-7}$ per ° C. while fused silica has a coefficient of about 5 to $6 \times 10^{-7}$. Various solder glass compositions called "frits" having a much lower melting or softening point temperature than the parts to be sealed have previously been used in an attempt to join parent glass and fused silica parts. However, such frits normally have an inherent and unavoidably high thermal expansion coefficient which is much higher than that of the parts to be sealed together. Wide differences in thermal expansion coefficients result in thermally-induced stresses in the seal and thus subsequent failure either during fabrication or while in service.

Accordingly, it is an object of the present invention to provide a cathode-ray tube envelope having a fused silica viewing member which is joined to a glass body member by a metallic ring member and a solder glass composition adapted for sealing to the metallic member.

Another object of the present invention is to provide a new article of manufacture, a composite assembly comprised of a light transmitting, fused silica face plate member and a parent glass body member, the several parts being joined by an annular metallic ring and two layers of dissimilar sealant materials adapted to join the several parts having widely varying thermal expansion coefficients.

A still further object of this invention is to provide a novel cathode-ray envelope having a body portion comprised of a conventional electrical glass, a fused silica viewing window, and an intermediate annular metallic ring, the fused silica and metallic ring being joined by at least two intermediate layers of dissimilar sealants adapted to form a durable vacuum-tight annular seal, one of the sealants being solder glass exhibiting the distinctive property of being readily reducible on its surface to the metallic state for bonding to the metallic ring by a second metal sealant. In this manner a reliable hermetic seal is obtained.

Referring to the accompanying sheets of drawings:
FIG. 1 is a vertical sectional view of a cathode-ray tube envelope fabricated in accordance with the present invention.

Figure 2:
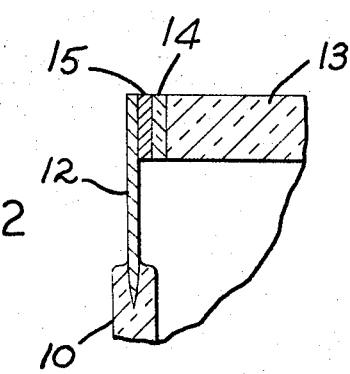

FIG. 2 is a fragmentary enlarged sectional view of one portion of FIG. 1 showing seal construction between the face plate and body members of the envelope.

Referring to FIG. 1, glass body part 10 of the envelope consists of a funnel-shaped hollow member terminating at its large end in a planar sealing surface of either rectangular or circular configuration when viewed in plan. The small end of the body part consists of a neck tubulation having the required beam emitting gun or guns 11 sealed therein. The glass body part preferably consists of either KG–12 or EN–1 type glass which is of particular utility in forming electron tube envelopes.

A thin metallic ring 12 which is comprised of either copper metal or Kovar metal alloy is joined to a larger end of body part 10 by a Housekeeper-type seal. In forming unmatched tubular seals of the Housekeeper-type, the metal ring such as copper is rolled to a feather edge and given a brief immersion in concentrated nitric acid followed by a thorough water washing. The copper develops a bright color and all traces of contaminants are removed. The body of the metallic ring is heated and treated with a saturated solution of borax to prepare the metal for joining to the glass. Details of making the Housekeeper-type seal are set forth on pages 110 to 112, inclusive, of the book entitled, "Glass-To-Metal Seals" by Partridge, published by the Society of Glass Technology, 1959. Making of the Housekeeper-type seal per se does not constitute the subject matter of the present invention, such seal being conventionally known in the art. Thus, body member 10 is provided with a forwardly-projecting cylindrical-shaped endless metal member 12 projecting from its large end, the tubular type of seal forming a durable hermetic joint between the glass and metal parts.

A fused silica window or face plate member 13 which may be either concavo-convex or planar in configuration is taken for joining interiorly of metallic ring 12. The peripheral dimensions of face plate 13 are complemental to and slightly smaller than annular metallic ring 12 to facilitate its being mounted interiorly thereof. The fused silica window may also be comprised of transparent low-expansion glass-ceramic material having a thermal coefficient of about 5 to $6 \times 10^{-7\circ}$ C. or less, depending upon the particular end use of the tube envelope.

The parent glass body part may have a thermal expansion of 90 to $95 \times 10^{-7\circ}$ C. while the metallic sealing ring which is preferably comprised of copper metal or Kovar alloy may have a thermal contraction coefficient of about $170 \times 10^{-7\circ}$ C., in the case of copper metal, and $62 \times 10^{-7\circ}$ C. in the case of Kovar metal alloy, measured over the range of 0–450° C.

Low expansion glass-ceramics may also be used in practicing the present invention as a substitute material for the light-transmitting fused silica or quartz face plate member. Generally, low expansion glass-ceramics having a coefficient of thermal expansion less than about $20 \times 10^{-7}$ and good working properties to facilitate the manufacture of the face plate member by conventional forming procedures are useful in the present invention. One example of a transparent low-expansion glass-ceramic is a composition comprising in percent by weight: 69% $SiO_2$, 19% $AO_2O_3$, 4% CaO, 3.8% $Li_2O$, 1.8% $TiO_2$, 2% $ZrO_2$, 0.1% $Na_2O$ and 0.3% $Sb_2O_3$, which composition is preferably formed into a highly crystalline glass-ceramic by a heat treatment at 746° C. for 480 hours, the resultant material having a thermal expansion coefficient of $0.6 \times 10^{-7}$ per degree C. measured over the range of 0 to 300° C. Another example is a glass-ceramic composition consisting essentially of 69.9% $SiO_2$, 18% $Al_2O_3$, 4% CaO, 4% $Li_2O$, 3.5% $ZrO_2$, 0.1% $Na_2O$ and 0.3% $Sb_2O_3$, a similar heat treatment cycle resulting in a thermal expansion coefficient of $0.5 \times 10^{-7}$ per degree C. (0–300° C.). Also a composition consisting essentially of 64.1% $SiO_2$, 20.9% $Al_2O_3$, 2.7 CaO, 3.7% $Li_2O$ 1.8% $TiO_2$, 2% $ZrO_2$, 0.5% $Na_2O$, 2.9% $B_2O_3$, 1.3% ZnO and 0.1% $As_2O_3$, such composition having an annealing point temperature of the glass of 663° C. and a heat treatment period of 64 hours at 719° C., resulting in an expansion coefficient of $3.1 \times 10^{-7}$ per degree C. (0–300° C.) may be used. The glass-ceramic material disclosed in Netherlands patent application Ser. No. 6,503,460 and other low-expansion glass-ceramic compositions arealso utilizable in the present invention. The aforementioned glass-ceramics are cited as exemplary and not to be construed as limiting since other low-expansion light-transmitting materials may be used in addition to fused silica to comprise the face plate member.

A thin layer or coating 14 of low-melting vitreous solder glass composition is bonded to the seal edge periphery of the fused silica or glass-ceramic face plate 13. An example of one such family of solder glass consists essentially of 75 to 80 mol. percent $SiO_2$, 8 to 12 mol. percent $Al_2O_3$, 10 to 15 mol. percent $Cu_2O$ and 0.2 to 4 mol. percent $AlF_3$. An example of a low-melting solder glass, particularly useful for sealing a fused silica window to a copper metal ring, is a composition consisting of 77.5 mol. percent $SiO_2$, 10 mol. percent $Al_2O_3$ and 12.5 mol. percent $Cu_2O$. Another example is glass consisting of 77.0 mol. percent $SiO_2$, 9.3 mol. percent $Al_2O_3$, 1.3 mol. percent $AlF_3$ and 12.5 mol. percent $Cu_2O$. Such solder glasses are preferably prepared from Kona Quintas quartz, Alcoa A–14 alumina, $AlF_3$ and $Cu_2O$ to produce the desired mol. percentage of $SiO_2$, $Al_2O_3$, $Cu_2O$ and $AlF_3$ in the resultant composition. A preferred melt consists generally of about 5 kilograms, the solder glass being prepared by blending the selected batch constituents in a suitable blender, melting the constituents in a 90% platinum-10% rhodium crucible at 1500 to 1600° C. for 15 to 16 hours in a gas-fired furnace using a slight excess of oxygen.

After the first layer 14 of low-melting vitreous solder glass is applied to the periphery of face plate 13, its exposed surfaces are preferably reduced in situ by heating the coated part to an elevated temperature of about 900° C. and then either immersing the entire part or progressively immersing its coated sealing edge in hydrogenated vegetable oil to produce a thick metallic layer of copper metal on its exteriorly exposed surfaces. Similarly, other methods such as a reducing gas atmosphere and elevated temperatures may be used to reduce the exterior surfaces of solder glass layer 14.

A second annular layer or coating 15 of metal sealant is used to unite solder glass layer 14 and annular metal member 12 into a durable vacuum-type joint. An example of metal sealant capable of joining such surfaces is a silver solder or a brazing composition. Silver solder is composed of silver, copper and zinc having a softening point temperature ranging from 682° to 820° C. as described in National Bureau of Standards Circular 492. With such sealant applied as a thin annular layer, it is fully capable of joining the reduced metal surface of solder glass layer 14 and the adjacent surface of metal ring 12 into a durable, hermetic joint capable of withstanding pressure caused by atmospheric loading on the evacuated tube envelope.

The several elements to be joined may also be sealed by a vitreous solder glass composition consisting essentially of 77.5 mol. percent $SiO_2$, 10 mol. percent $Al_2O_3$, and 12.5 mol. percent $Cu_2O$. Also a devitrifying-type solder glass may be employed. Layer 15 of solder glass may be applied to the edge surface of the first applied layer 14 of reduced solder glass in any conventional manner such as a bead or in paste form. The sealing glass previously drawn into a fibre form may be applied to the surface by a gas-oxygen hand torch or a hydrogen-oxygen torch. However, care must be exercised in heating the fused silica or glass ceramic member not to overheat same, such as to glaze or devitrify its edge portions, or to produce distortion of its light-transmitting surfaces.

The coefficient of thermal expansion of fused silica being generally about 5 to $6 \times 10^{-7\circ}$ C. makes it exceedingly difficult to join to a relatively high expansion metallic member such as either Kovar metal alloy or copper metal. Where the readily-reducible solder glass such as that described hereinabove comprises layer 14 having its outer surface reduced to the metallic state, such surface layer exhibits expansion characteristics approaching that of the basic elemental metal, i.e., copper, in the case of the given examples. A durable joint can thus be made by solder glass layer 15 without undue stresses being created in the resultant steel.

The present invention is especially adapted for use in sealing fused silica or glass-ceramic compositions having low thermal expansion coefficients to an intermediate metallic ring which can be used as an electrode or, alternately, the intermediate member of two different type seals. Such construction permits the making of a reliable hermetic joint directly between such parts where it has been impractical or impossible to fabricate such joints in following the prior art. The foregoing compositional formulas are given by way of example and not as indicating the limits of the invention.

Modifications may be resorted to within the spirit and scope of the appended claims.

What is claimed is:

1. As an article of manufacture, a cathode-ray tube envelope comprising a preformed hollow glass body member terminating at its larger end in an annular sealing surface, an annular metallic ring hermetically sealed to said annular sealing surface, a face plate member composed of fused silica adapted to enclose the larger end of said body member, a first layer of low melting low-expansion vitreous solder glass fusedly sealed to the periphery of said face plate member, said solder glass having a coefficient of thermal expansion less than $10 \times 10^{-7}$ cm./cm./° C. (0–300° C.) and consisting essentially of 75 to 80 mol. percent $SiO_2$, 8 to 12 mol. percent $Al_2O_3$, 10 to 15 mol. percent $Cu_2O$, and 0.2 to 4 mol. percent $AlF_3$, and a second annular layer of sealant hermetically joining said first layer and said annular metallic ring in vacuum-tight relation.

2. An article of manufacture in accordance with claim 1, wherein said annular metallic ring consists of copper metal hermetically sealed to said glass body member by a Housekeeper-type seal.

3. An article of manufacture in accordance with claim 1, wherein said face plate member is comprised of light-transmitting fused silica which is contacted by said vitreous solder glass at its non-viewing peripheral area.

4. An article of manufacture in accordance with claim 1, wherein said first layer of low-melting vitreous solder glass consists essentially of

| | Mol percent |
|---|---|
| $SiO_2$ | 77.5 |
| $Al_2O_3$ | 9.8 |
| $Cu_2O$ | 12.4 |
| $AlF_3$ | 0.4 | having a coefficient of thermal expansion of about $5.5 \times 10^{-7}$° C. (0–300° C.).

5. As an article of manufacture in accordance with claim 1, wherein said hollow glass body member consists essentially of the following composition in mol percent:

| | |
|---|---|
| $SiO_2$ | 75.6 |
| $Al_2O_3$ | 1.0 |
| $Na_2O$ | 5.0 |
| $K_2O$ | 7.5 |
| $PbO$ | 10.7 |
| $As_2O_3$ | 0.2 |

6. An article of manufacture in accordance with claim 1, wherein said glass body member consists essentially of the following composition in mol percent:

| | |
|---|---|
| $SiO_2$ | 69.2 |
| $Al_2O_3$ | 4.6 |
| $Na_2O$ | 2.5 |
| $K_2O$ | 2.4 |
| $B_2O_3$ | 18.2 |
| $Li_2O$ | 1.6 |
| $BaO$ | 1.2 |
| $CaO+MgO$ | 0.3 |

7. An article of manufacture in accordance with claim 1, wherein said second annular layer of sealant comprises a silver-containing metal solder.

8. A cathode-ray tube envelope comprising a prefabricated hollow glass body member terminating at its larger end in a planar annular sealing edge, an annular copper metal ring hermetically sealed to said annular sealing edge with a Housekeeper-type seal, a face plate member consisting of fused silica adapted to enclose the larger end of said body member, a first annular layer of vitreous-type solder glass having a coefficient of thermal expansion of about $6 \times 10^{-7}$ cm./cm./° C. (0–300° C.) fusedly adhered to the periphery of said face plate member with its exposed surface reduced to the metallic state, said solder glass consisting essentially of 75 to 80 mol percent $SiO_2$, 8 to 12 mol percent $Al_2O_3$, 10 to 15 mol percent $Cu_2O$, and 0.2 to 4 mol percent $AlF_3$, and a second annular layer of metal-to-metal sealant having a different composition hermetically joining said first annular layer of solder glass and said copper metal ring into a vacuum-tight seal.

References Cited
UNITED STATES PATENTS 3,243,072 3/1966 Day _____ 220—2.3
3,335,310 8/1967 Ney _____ 220—2.1 X MARTHA L. RICE, *Primary Examiner.*

UNITED STATES PATENT OFFICE
CERTIFICATE OF CORRECTION

Patent No. 3,404,769                                                             October 8, 1968

Frederic Lendall Bishop

It is certified that error appears in the above identified patent and that said Letters Patent are hereby corrected as shown below:

Column 1, line 31, "envelopes. Fused silica which consists of a tightly-bonded" should read -- subject cathode-ray tube envelope is capable of expedient --.

Signed and sealed this 10th day of March, 1970.

(SEAL)
Attest:

Edward M. Fletcher, Jr.                                     WILLIAM E. SCHUYLER, JR.
Attesting Officer                                                          Commissioner of Patents